(12) United States Patent
Ota et al.

(10) Patent No.: US 10,232,319 B2
(45) Date of Patent: Mar. 19, 2019

(54) COMPOSITION FOR $CO_2$ GAS SEPARATION MEMBRANE, $CO_2$ GAS SEPARATION MEMBRANE AND METHOD FOR PRODUCING SAME, AND $CO_2$ GAS SEPARATION MEMBRANE MODULE

(71) Applicants: SUMITOMO CHEMICAL COMPANY, LIMITED, Tokyo (JP); RENAISSANCE ENERGY RESEARCH CORPORATION, Kyoto-shi, Kyoto (JP)

(72) Inventors: Yudai Ota, Osaka (JP); Yoshihito Okubo, Phoenix, AZ (US); Osamu Okada, Kyoto (JP); Nobuaki Hanai, Kyoto (JP); Peng Yan, Kyoto (JP); Yasato Kiyohara, Kyoto (JP); Atsushi Yamamoto, Osaka (JP)

(73) Assignees: SUMITOMO CHEMICAL COMPANY, LIMITED, Chuo-ku, Tokyo (JP); RENAISSANCE ENERGY RESEARCH CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/503,228

(22) PCT Filed: Aug. 6, 2015

(86) PCT No.: PCT/JP2015/072382
§ 371 (c)(1),
(2) Date: Feb. 10, 2017

(87) PCT Pub. No.: WO2016/024523
PCT Pub. Date: Feb. 18, 2016

(65) Prior Publication Data
US 2017/0232398 A1    Aug. 17, 2017

(30) Foreign Application Priority Data

Aug. 11, 2014    (JP) .................................. 2014-163493

(51) Int. Cl.
*B01D 53/22* (2006.01)
*B01D 63/10* (2006.01)
(Continued)

(52) U.S. Cl.
CPC ......... *B01D 67/0088* (2013.01); *B01D 53/22* (2013.01); *B01D 53/228* (2013.01);
(Continued)

(58) Field of Classification Search
CPC .. B01D 53/228; B01D 63/10; B01D 67/0088; B01D 69/10; B01D 69/142; B01D 71/022; B01D 71/36; B01D 2257/504
See application file for complete search history.

(56) References Cited

U.S. PATENT DOCUMENTS 5,445,669 A * 8/1995 Nakabayashi ....... B01D 53/228
                                                              423/226
6,315,968 B1   11/2001 Quinn et al.
(Continued)

FOREIGN PATENT DOCUMENTS

CN    103702747 A    4/2014
EP    0 629 411 A1   12/1994
(Continued)

OTHER PUBLICATIONS

International Search Report for PCT/JP2015/072382 dated Oct. 20, 2015 [PCT/ISA/210].
(Continued)

*Primary Examiner* — Jason M Greene
(74) *Attorney, Agent, or Firm* — Sughrue Mion, PLLC

(57) ABSTRACT

The present invention provides a composition for a $CO_2$ gas separation membrane containing: at least one compound
(Continued)

selected from the group consisting of an alkali metal carbonate, an alkali metal bicarbonate, and an alkali metal hydroxide; a crosslinked polymer in which a polymer having a carboxyl group has been crosslinked; and a non-crosslinked polymer obtained by polymerization of one or more monomers selected from the group consisting of vinyl acetate, acrylic acid, methacrylic acid, and a derivative thereof.

18 Claims, 1 Drawing Sheet

(51) Int. Cl.
  B01D 67/00    (2006.01)
  B01D 69/10    (2006.01)
  B01D 71/02    (2006.01)
  B01D 71/36    (2006.01)
  B01D 63/00    (2006.01)
  B01D 69/00    (2006.01)
  B01D 69/12    (2006.01)
  B01D 71/32    (2006.01)
  B01D 71/38    (2006.01)
  B01D 71/40    (2006.01)
  B01D 71/64    (2006.01)
  B01D 71/66    (2006.01)
  B01D 71/68    (2006.01)

(52) U.S. Cl.
  CPC ............ *B01D 63/00* (2013.01); *B01D 63/10* (2013.01); *B01D 69/00* (2013.01); *B01D 69/10* (2013.01); *B01D 69/12* (2013.01); *B01D 71/02* (2013.01); *B01D 71/022* (2013.01); *B01D 71/32* (2013.01); *B01D 71/36* (2013.01); *B01D 71/38* (2013.01); *B01D 71/40* (2013.01); *B01D 71/64* (2013.01); *B01D 71/66* (2013.01); *B01D 71/68* (2013.01); *Y02C 10/10* (2013.01); *Y02P 20/152* (2015.11)

(56) References Cited

U.S. PATENT DOCUMENTS

| | | | |
|---|---|---|---|
| 7,906,143 B1* | 3/2011 | Odidi | A61K 9/2054 424/425 |
| 2001/0030127 A1* | 10/2001 | Li | B01D 53/228 204/252 |
| 2005/0159571 A1 | 7/2005 | Hamamoto et al. | |
| 2011/0036237 A1 | 2/2011 | Okade et al. | |
| 2012/0297976 A1 | 11/2012 | Sano | |
| 2013/0199370 A1 | 8/2013 | Okada et al. | |
| 2013/0287678 A1 | 10/2013 | Okada et al. | |
| 2014/0137740 A1 | 5/2014 | Aburaya et al. | |
| 2014/0260986 A1 | 9/2014 | Ishizuka et al. | |
| 2014/0352540 A1 | 12/2014 | Okada et al. | |
| 2015/0151243 A1 | 6/2015 | Okade et al. | |
| 2015/0283518 A1 | 10/2015 | Hirose et al. | |
| 2016/0008767 A1 | 1/2016 | Yoneyama | |
| 2016/0008768 A1 | 1/2016 | Yoneyama et al. | |

FOREIGN PATENT DOCUMENTS

| | | |
|---|---|---|
| EP | 2985072 A1 | 2/2016 |
| JP | S63-126506 A | 5/1988 |
| JP | 64-070125 A | 3/1989 |
| JP | 07-088171 A | 4/1995 |
| JP | 07-112122 A | 5/1995 |
| JP | 08-193156 A | 7/1996 |
| JP | H08-229367 A | 9/1996 |
| JP | H08-243364 A | 9/1996 |
| JP | H09-267017 A | 10/1997 |
| JP | 2003-268009 A | 9/2003 |
| JP | 2008-036463 A | 2/2008 |
| JP | 2008-036464 A | 2/2008 |
| JP | 2009-195900 A | 9/2009 |
| JP | 2011-183379 A | 9/2011 |
| JP | 2013-027806 A | 2/2013 |
| JP | 2013-027841 A | 2/2013 |
| JP | 2013-027850 A | 2/2013 |
| JP | 2013-049048 A | 3/2013 |
| JP | 2013-111507 A | 6/2013 |
| JP | 2014-195761 A | 10/2014 |
| JP | 2014-195762 A | 10/2014 |
| JP | 2015-061721 A | 4/2015 |
| WO | 2009/093666 A1 | 7/2009 |
| WO | 2012/086836 A1 | 6/2012 |
| WO | 2012/014900 A1 | 9/2013 |
| WO | 2014/054619 A1 | 4/2014 |
| WO | 2014/065387 A1 | 5/2014 |
| WO | 2014157069 A1 | 10/2014 |
| WO | 2016/080400 A1 | 5/2016 |

OTHER PUBLICATIONS

International Search Report of PCT/JP2015/082280 dated Feb. 9, 2016.
Extended European Search Report dated Feb. 21, 2018 issued by the European Patent Office in counterpart application No. 15832072.1.
Communication dated May 29, 2018, from European Patent Office in counterpart application No. 15861252.3.
Communication dated Oct. 8, 2018 from the State Intellectual Property Office of the P.R.C. in counterpart Application No. 201580043095.8.

* cited by examiner

COMPOSITION FOR $CO_2$ GAS SEPARATION MEMBRANE, $CO_2$ GAS SEPARATION MEMBRANE AND METHOD FOR PRODUCING SAME, AND $CO_2$ GAS SEPARATION MEMBRANE MODULE

CROSS REFERENCE TO RELATED APPLICATIONS

This application is a National Stage of International Application No. PCT/JP2015/072382 filed Aug. 6, 2015, claiming priority based on Japanese Patent Application No. 2014-163493 filed Aug. 11, 2014, the contents of all of which are incorporated herein by reference in their entirety.

TECHNICAL FIELD

The present invention relates to a gas separation membrane for separating $CO_2$ from a gas mixture that contains at least $CO_2$ and water vapor, a method for producing the membrane, and others.

BACKGROUND ART

Gas membrane separation processes have received attention in recent years because of their capability of achieving energy conservation when used as a process for separating $CO_2$ from various gases such as natural or exhaust gases as well as synthetic gases that are synthesized in large-scale plants for hydrogen or urea production.

Various separation membranes have been hitherto proposed as gas separation membranes for use in these gas membrane separation processes. For example, it is proposed in Japanese Patent Laying-Open No. 08-193156 (PTD 1) that a $CO_2$ separation membrane may be formed from a resin composition including a reaction mixture obtained by reacting a polyacrylic acid with a predetermined equivalent of aliphatic amine. It is proposed in Japanese Patent Laying-Open No. 2013-49048 (PTD 2) that a $CO_2$-facilitated transport membrane may be made by depositing a gel layer onto a heat-resistant porous membrane, the gel layer having glycine and a deprotonating agent contained in a hydrogel membrane. In Japanese Patent Laying-Open No. 64-70125 (PTD 3), a method is proposed for separating gases by using an ion-exchange membrane made from a fluorine-containing polymer having an ion-exchange group with a weak acid or its salt and having a specified amount of ion-exchange capacity.

CITATION LIST

Patent Document

PTD 1: Japanese Patent Laying-Open No. 08-193156
PTD 2: Japanese Patent Laying-Open No. 2013-49048
PTD 3: Japanese Patent Laying-Open No. 64-70125

SUMMARY OF INVENTION

Technical Problems

However, those gas separation membranes proposed hitherto have been still unsatisfactory in their $CO_2$ permeance, $CO_2$ permselectivity, and film-forming property.

It is an object of the present invention to provide a gas separation membrane having high $CO_2$ permeance and high $CO_2$ permselectivity with stable film-forming property.

Solutions to Problems

The present invention provides a composition for a $CO_2$ gas separation membrane, containing: at least one compound selected from the group consisting of an alkali metal carbonate, an alkali metal bicarbonate, and an alkali metal hydroxide; a crosslinked polymer in which a polymer having a carboxyl group has been crosslinked; and a non-crosslinked polymer obtained by polymerization of one or more monomers selected from the group consisting of vinyl acetate, acrylic acid, methacrylic acid, and a derivative thereof.

Preferably, the non-crosslinked polymer contained in the composition for a $CO_2$ gas separation membrane of the present invention includes a structural unit having one or more functional groups selected from the group consisting of a carboxyl group, a hydroxy group and a carbamoyl group, and the structural unit has a total content of 50 mol % to 100 mol % based on the total amount of all structural units included in the non-crosslinked polymer.

Preferably, the crosslinked polymer contained in the composition for a $CO_2$ gas separation membrane of the present invention, in which a polymer having a carboxyl group has been crosslinked, includes a structural unit derived from acrylic acid, methacrylic acid, or a derivative thereof.

Preferably, the at least one compound selected from the group consisting of an alkali metal carbonate, an alkali metal bicarbonate, and an alkali metal hydroxide is a carbonate, bicarbonate or hydroxide of at least one alkali metal selected from the group consisting of Na, K, Rb and Cs.

More preferably, the at least one compound selected from the group consisting of an alkali metal carbonate, an alkali metal bicarbonate, and an alkali metal hydroxide is cesium carbonate or cesium hydroxide.

The composition for a $CO_2$ gas separation membrane of the present invention may further contain lithium carbonate or lithium hydroxide in addition to the crosslinked polymer, the non-crosslinked polymer, and the carbonate, bicarbonate or hydroxide of at least one alkali metal selected from the group consisting of Na, K, Rb and Cs.

The composition for a $CO_2$ gas separation membrane of the present invention may further contain a $CO_2$ hydration catalyst.

Preferably, the composition for a $CO_2$ gas separation membrane of the present invention contains totally 1 mole equivalent to 6 mole equivalents of alkali metal cations based on the total amount of the carboxyl group and carboxylate included in the crosslinked polymer and the non-crosslinked polymer.

The present invention provides a $CO_2$ gas separation membrane including: a separation-functional layer containing the composition for a $CO_2$ gas separation membrane; and a supporting layer including a porous membrane. Preferably, the porous membrane is made from at least one material selected from the group consisting of ceramic, a fluorine-containing resin, polyphenylene sulfide, polyether sulfone, and polyimide.

Preferably, the porous membrane has pores with an average pore diameter of 0.005 μm to 1.0 μm.

The present invention provides a method for producing the $CO_2$ gas separation membrane, including the steps of: preparing a coating liquid by dissolving, in a medium, a composition for a $CO_2$ separation membrane containing: at least one compound selected from the group consisting of an alkali metal carbonate, an alkali metal bicarbonate, and an alkali metal hydroxide; a crosslinked polymer prepared through crosslinking of a polymer having a carboxyl group;

and a non-crosslinked polymer obtained by polymerization of one or more monomers selected from the group consisting of vinyl acetate, acrylic acid, methacrylic acid, and a derivative thereof; forming a coating film by applying the prepared coating liquid onto a supporting layer including a porous membrane; and forming a separation-functional layer by removing the medium from the formed coating film.

The present invention provides a method for separating $CO_2$ gas, including: feeding a gas mixture that contains at least $CO_2$ and water vapor on a surface side of the $CO_2$ gas separation membrane of any one aspect as defined above; and separating $CO_2$ from the gas mixture through the other surface side of the gas separation membrane.

The present invention provides a $CO_2$ gas separation membrane module including the gas separation membrane of any one aspect as defined above. Preferably, the $CO_2$ gas separation membrane module includes a spiral-wound element having the structure wherein a laminate is wrapped around an outer periphery of a hollow gas-collecting tube with a plurality of holes formed in a wall surface of the tube, the laminate including the gas separation membrane, a feed-side channel member serving as a flow channel for a gas component to be fed, and a permeate-side channel member serving as a flow channel for a gas component that has permeated through the gas separation membrane.

The present invention provides a $CO_2$ gas separation apparatus including: the $CO_2$ gas separation membrane module as defined above; and a gas feeding part for feeding a gas mixture that contains at least $CO_2$ and water vapor to the $CO_2$ gas separation membrane module.

Advantageous Effects of Invention

The $CO_2$ gas separation membrane of the present invention has high $CO_2$ permeance and high $CO_2$ permselectivity with stable film-forming property.

DESCRIPTION OF EMBODIMENTS

Figure 1:
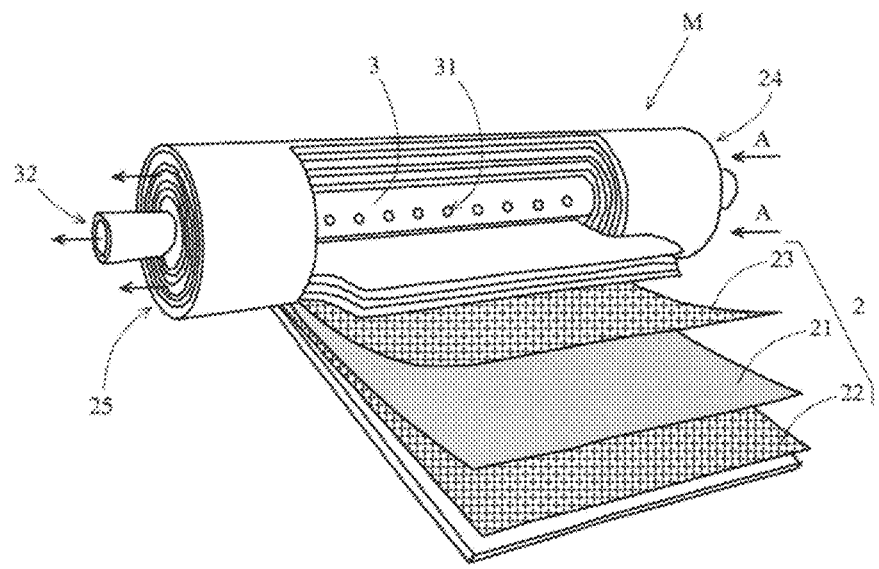
FIG. 1 is a schematic view with partial cutaway showing a structure of a spiral $CO_2$ gas separation membrane module including a gas separation membrane of the present invention.

The $CO_2$ gas separation membrane of the present invention is significantly characterized in that the membrane includes a separation-functional layer containing a composition for a $CO_2$ gas separation membrane and a supporting layer including a porous membrane, wherein the composition contains: at least one compound selected from the group consisting of an alkali metal carbonate, an alkali metal bicarbonate, and an alkali metal hydroxide; a crosslinked polymer in which a polymer having a carboxyl group has been crosslinked; and a non-crosslinked polymer obtained by polymerization of one or more monomers selected from the group consisting of vinyl acetate, acrylic acid, methacrylic acid, and a derivative thereof.

(Crosslinked Polymer)

The $CO_2$ gas separation membrane of the present invention achieves high permselectivity for a specific gas due to a facilitated transport mechanism that includes a substance, called a $CO_2$ carrier, capable of making reversible reaction with $CO_2$ to facilitate permeation of a specific gas in the form of a reaction product with the $CO_2$ carrier, as well as a solution-diffusion mechanism that utilizes a difference in solubility and diffusivity of gas molecules in a membrane. The following formula (1) represents a reaction between $CO_2$ and a $CO_2$ carrier when the $CO_2$ carrier used therein is cesium carbonate ($Cs_2CO_3$). As used herein, the symbol "↔" in reaction formulae denotes reversibility in the reactions.

$$CO_2 + Cs_2CO_3 + H_2O \leftrightarrow 2CsHCO_3 \qquad (1)$$

Because water is required to make the reversible reaction between $CO_2$ and a $CO_2$ carrier as shown in the formula (1), a polymer contained in the separation-functional layer of the membrane is preferably a polymer having a carboxyl group that is hydrophilic, more preferably a crosslinked polymer having a network structure where carboxyl group-containing polymer chains are crosslinked with each other, thereby exhibiting an increased water retention property.

Since a large pressure difference is applied as a driving force for gas permeation through the membrane, the crosslinked polymer is preferably used as the polymer contained in the separation-functional layer of the membrane in view of the required pressure resistance of the membrane.

The composition for a $CO_2$ gas separation membrane of the present invention contains the crosslinked polymer in which a polymer having a carboxyl group has been crosslinked. The crosslinked polymer preferably has a viscosity of higher than or equal to 500 mPa·s and lower than 50000 mPa·s. As used herein, the viscosity means a value determined by measuring an aqueous 0.2 wt % solution of the crosslinked polymer using a Brookfield viscometer under the conditions of pH 7 at a temperature of 25° C. and a rotational speed of 20 rpm. When the viscosity is lower than 500 mPa·s, the crosslinked polymer has an insufficient pressure resistance, and the resultant separation-functional layer may fail to work properly in the gas separation membrane. On the other hand, when the viscosity is higher than 50000 mPa·s, it may excessively suppress swelling which is caused by water absorption of the crosslinked polymer, resulting in extreme reduction in water retention. The viscosity of the crosslinked polymer is more preferably higher than or equal to 800 mPa·s and lower than 45000 mPa·s, further preferably higher than or equal to 1000 mPa·s and lower than 40000 mPa·s.

Preferably, the polymer having a carboxyl group has a structural unit derived from acrylic acid, methacrylic acid, or a derivative thereof. Examples of the polymer having a carboxyl group include polymers obtained by polymerization of monomers of acrylic acid, itaconic acid, crotonic acid, methacrylic acid or the like. Specific examples of the polymer include a polyacrylic acid, a polyitaconic acid, a polycrotonic acid, a polymethacrylic acid, an acrylic acid-methacrylic acid copolymer, an acrylic acid-methyl methacrylate copolymer, and a methacrylic acid-methyl methacrylate copolymer. Especially, a polyacrylic acid that is a polymer of acrylic acid, a polymethacrylic acid that is a polymer of methacrylic acid, and an acrylic acid-methacrylic acid copolymer obtained by polymerization of acrylic acid and methacrylic acid are preferred, and more preferred is a polyacrylic acid.

The crosslinked polymer used in the present invention may be prepared by a reaction between a polymer having a carboxyl group and a crosslinking agent, or may be prepared by polymerizing a crosslinkable monomer with a monomer having a carboxyl group or an alkyl ester group that can undergo hydrolysis reaction to form a carboxyl group. The carboxyl group included in the crosslinked polymer may be totally or partially substituted with carboxylate through neutralization with a metal ion. The metal ion is preferably an alkali metal cation. With regard to the timing of the neutralization reaction, it is preferred that the neutralization reaction be performed following preparation of the crosslinked polymer. Examples of the monomer having an alkyl ester group include acrylic acid alkyl esters having an alkyl group with 1 to 16 carbon atoms, such as methyl acrylate, ethyl acrylate, propyl acrylate, butyl acrylate, hexyl acrylate, octyl acrylate and lauryl acrylate; itaconic acid alkyl esters having an alkyl group with 1 to 16 carbon atoms, such as methyl itaconate, ethyl itaconate, propyl itaconate, butyl itaconate, hexyl itaconate, octyl itaconate and lauryl itaconate; crotonic acid alkyl esters having an alkyl group with 1 to 16 carbon atoms, such as methyl crotonate, ethyl crotonate, propyl crotonate, butyl crotonate, hexyl crotonate, octyl crotonate and lauryl crotonate; and methacrylic acid alkyl esters having an alkyl group with 1 to 16 carbon atoms, such as methyl methacrylate, ethyl methacrylate, propyl methacrylate, butyl methacrylate, hexyl methacrylate, octyl methacrylate and lauryl methacrylate. The crosslinkable monomer and the crosslinking agent used in the present invention may be a conventionally known one without any limitation. Examples of the crosslinkable monomer include divinylbenzene, N,N'-methylenebisacrylamide, trimethylolpropane triallyl ether and pentaerythritol tetraallyl ether. Examples of the crosslinking agent include epoxy crosslinking agents, polyvalent glycidyl ethers, polyhydric alcohols, polyvalent isocyanates, polyvalent aziridines, haloepoxy compounds, polyvalent aldehydes, polyvalent amines, organometallic crosslinking agents, and metallic crosslinking agents. The crosslinkable monomer and the crosslinking agent are preferably ones having resistance to alkalis. Any conventionally known approaches may be employed as a method for crosslinking, including thermal crosslinking, ultraviolet crosslinking, electron beam crosslinking, radiation crosslinking, photocrosslinking, and a method described in Japanese Patent Laying-Open No. 2003-268009 or 07-088171. While the timing of preparing the crosslinked polymer is not particularly limited, the crosslinked polymer is preferably prepared before being mixed with a $CO_2$ carrier or a non-crosslinked polymer.

The crosslinked polymer used in the present invention may be commercially available one. Examples of the crosslinked polymer of a polyacrylic acid include AQUPEC (registered trademark, manufactured by SUMITOMO SEIKA CHEMICALS CO., LTD.) and SANFRESH (registered trademark, manufactured by Sanyo Chemical Industries, Ltd.).

(Non-Crosslinked Polymer)

The composition for a $CO_2$ gas separation membrane of the present invention contains the crosslinked polymer in which a polymer having a carboxyl group has been crosslinked, and a non-crosslinked polymer. In comparison with the composition containing only the crosslinked polymer, the composition also containing the non-crosslinked polymer improves the film-forming property of the composition for a $CO_2$ gas separation membrane. The non-crosslinked polymer is obtained by using one or more monomers selected from the group consisting of vinyl acetate, acrylic acid, methacrylic acid, and a derivative thereof as a raw material. The non-crosslinked polymer content is preferably 1 wt % to 99 wt %, more preferably 2 wt % to 90 wt %, further preferably 2 wt % to 80 wt % based on the total amount of the crosslinked polymer and the non-crosslinked polymer.

Examples of one or more monomers selected from the group consisting of vinyl acetate, acrylic acid, methacrylic acid, and a derivative thereof used as a raw material to obtain the non-crosslinked polymer include vinyl esters of fatty acids with 2 to 16 carbon atoms, such as vinyl acetate, vinyl propionate, vinyl butyrate, vinyl caproate, vinyl laurate, vinyl palmitate, vinyl stearate and vinyl versatate; acrylic acid, and acrylic acid alkyl esters having an alkyl group with 1 to 16 carbon atoms, such as methyl acrylate, ethyl acrylate, propyl acrylate, butyl acrylate, hexyl acrylate, octyl acrylate and lauryl acrylate; methacrylic acid, and methacrylic acid alkyl esters having an alkyl group with 1 to 16 carbon atoms, such as methyl methacrylate, ethyl methacrylate, propyl methacrylate, butyl methacrylate, hexyl methacrylate, octyl methacrylate and lauryl methacrylate; itaconic acid, and itaconic acid dialkyl esters having an alkyl group with 1 to 16 carbon atoms, such as dimethyl itaconate, diethyl itaconate, dibutyl itaconate, dihexyl itaconate, dioctyl itaconate and dilauryl itaconate; crotonic acid, and crotonic acid alkyl esters having an alkyl group with 1 to 16 carbon atoms, such as methyl crotonate, ethyl crotonate, propyl crotonate, butyl crotonate, hexyl crotonate, octyl crotonate and lauryl crotonate; and others including acrylamide and acrylonitrile.

Examples of the non-crosslinked polymer obtained by polymerization of one or more monomers selected from the group consisting of vinyl acetate, acrylic acid, methacrylic acid, and a derivative thereof include polyvinyl alcohol, a polyacrylic acid, a polyitaconic acid, a polycrotonic acid, polyacrylamide, a polymethacrylic acid, a vinyl alcohol-acrylic acid copolymer, an acrylic acid-methacrylic acid copolymer, an acrylic acid-methyl methacrylate copolymer, a methacrylic acid-methyl methacrylate copolymer, and an acrylic acid-acrylamide copolymer. Of these polymers, a polyacrylic acid, a polymethacrylic acid, an acrylic acid-methacrylic acid copolymer, a vinyl alcohol-acrylic acid copolymer and an acrylic acid-acrylamide copolymer are preferred, and a polyacrylic acid, a polymethacrylic acid and an acrylic acid-methacrylic acid copolymer are more preferred. The non-crosslinked polymer may be prepared by hydrolysis of polymers obtained by polymerization of one or more monomers selected from the group consisting of vinyl acetate, acrylic acid, methacrylic acid, and a derivative thereof.

Preferably, the non-crosslinked polymer obtained by polymerization of one or more monomers selected from the group consisting of vinyl acetate, acrylic acid, methacrylic acid, and a derivative thereof has a structural unit having one or more functional groups selected from the group consisting of a carboxyl group, a hydroxy group and a carbamoyl group. The total content of the structural unit having one or more functional groups selected from the group consisting of a carboxyl group, a hydroxy group and a carbamoyl group included in the non-crosslinked polymer is preferably 50 mol % to 100 mol %, more preferably 60 mol % to 100 mol %, even more preferably 70 mol % to 100 mol % based on the total amount of all structural units included in the non-crosslinked polymer.

The non-crosslinked polymer contained in the composition for a $CO_2$ gas separation membrane of the present invention has a viscosity of higher than or equal to 100 mPa·s and lower than 1500 mPa·s, and preferably has a lower viscosity than the crosslinked polymer. As used herein, the viscosity means a value determined by measurement under the same conditions as those in the crosslinked polymer. When the viscosity is lower than 100 mPa·s, the separation-functional layer may have poor flexibility, and the film-forming property may be deteriorated. On the other hand, when the viscosity is higher than 1500 mPa·s, it may be difficult to synthesize the non-crosslinked polymer. The viscosity of the non-crosslinked polymer is more preferably higher than or equal to 150 mPa·s and lower than 1200 mPa·s, further preferably higher than or equal to 200 mPa·s and lower than 1000 mPa·s.

The non-crosslinked polymer used in the present invention may be commercially available one. Examples of the non-crosslinked polymer of polyacrylic acid include AQUPAANA (registered trademark, manufactured by SUMITOMO SEIKA CHEMICALS CO., LTD.) and AQUALIC (registered trademark, manufactured by NIPPON SHOKUBAI CO., LTD.).

($CO_2$ Carrier)

The composition for a $CO_2$ gas separation membrane of the present invention contains at least one compound (hereinafter also referred to as a $CO_2$ carrier) selected from the group consisting of an alkali metal carbonate, an alkali metal bicarbonate, and an alkali metal hydroxide. The $CO_2$ carrier is present in the separation-functional layer containing the above-mentioned crosslinked polymer and non-crosslinked polymer, and may undergo reversible reaction with $CO_2$ that has been dissolved in water in the separation-functional layer, so that the carrier can play a role in selective permeation of $CO_2$.

The at least one compound selected from the group consisting of an alkali metal carbonate, an alkali metal bicarbonate, and an alkali metal hydroxide used in the present invention is preferably a carbonate, bicarbonate or hydroxide of at least one alkali metal selected from the group consisting of Na, K, Rb and Cs.

Examples of the alkali metal carbonate include sodium carbonate, potassium carbonate, rubidium carbonate, and cesium carbonate. Examples of the alkali metal bicarbonate include sodium bicarbonate, potassium bicarbonate, rubidium bicarbonate, and cesium bicarbonate. Examples of the alkali metal hydroxide include sodium hydroxide, potassium hydroxide, rubidium hydroxide, and cesium hydroxide.

The at least one compound selected from the group consisting of an alkali metal carbonate, an alkali metal bicarbonate, and an alkali metal hydroxide is preferably an alkali metal carbonate or alkali metal hydroxide that is of a deliquescent nature, more preferably cesium carbonate or cesium hydroxide having a high water solubility.

For the purpose of further improving $CO_2$ permeance, it is preferred that carboxyl groups contained in the crosslinked polymer and non-crosslinked polymer be neutralized by cations of alkali metal included in the $CO_2$ carrier so that the alkali metal carbonate, alkali metal bicarbonate and alkali metal hydroxide added in the composition can function as a $CO_2$ carrier.

(Additive)

The composition for a $CO_2$ gas separation membrane of the present invention may further contain lithium carbonate or lithium hydroxide, in addition to the crosslinked polymer, the non-crosslinked polymer and the carbonate, bicarbonate or hydroxide of at least one alkali metal selected from the group consisting of Na, K, Rb and Cs.

The composition for a $CO_2$ gas separation membrane of the present invention may further contain a $CO_2$ hydration catalyst, which will be described below.

The composition for a $CO_2$ gas separation membrane of the present invention may contain, in addition to the alkali metal cations derived from the $CO_2$ carrier, various alkali metal cations such as those used in neutralization of the carboxyl groups contained in the crosslinked and non-crosslinked polymers, those derived from lithium carbonate or lithium hydroxide, and those derived from the $CO_2$ hydration catalyst. Preferably, the amount of all the alkali metal cations contained in the composition for a $CO_2$ gas separation membrane is 1 mole equivalent to 6 mole equivalents based on the total amount of the carboxyl group and carboxylate included in the crosslinked and non-crosslinked polymers. When the amount of the alkali metal cations is less than 1 mole equivalent based on the total amount of the carboxyl group and carboxylate, the film-forming property may be impaired. On the other hand, when the amount of the alkali metal cations is more than 6 mole equivalents based on the total amount of the carboxyl group and carboxylate, it may fail to provide the desired $CO_2$ permselectivity. The amount of all the alkali metal cations is more preferably 1.5 mole equivalents to 5 mole equivalents based on the total amount of the carboxyl group and carboxylate.

(Porous Membrane-containing Supporting Layer)

The $CO_2$ gas separation membrane of the present invention has a supporting layer including a porous membrane with high gas permeability that does not have a gas diffusion resistance against a gas component that has permeated through the membrane. When the separation-functional layer made from the composition for a $CO_2$ gas separation membrane is placed in contact with one surface of the supporting layer, the use of the supporting layer including a hydrophobic porous membrane may prevent water in the separation-functional layer from entering the pores of the porous membrane, and suppress reduction in performance of the membrane.

When the separation-functional layer made from the composition for a $CO_2$ gas separation membrane is placed in contact with one surface of the supporting layer including a hydrophobic porous membrane, a surfactant described below may be applied in advance onto the surface of the hydrophobic porous membrane included in the supporting layer to be used, for the purpose of improving the film-forming property.

In the process of the hydrogen or urea production to which the $CO_2$ gas separation membrane of the present invention is to be applied, the gas separation membrane may be used at a temperature of higher than or equal to 100° C. Therefore, it is preferred that the porous membrane or other members included in the gas separation membrane have a heat resistance of higher than or equal to 100° C.

The term "hydrophobic" means that the water contact angle at 25° C. is greater than or equal to 90°. The "heat resistance of higher than or equal to 100° C." means that the porous membrane can be kept under a temperature condition of higher than or equal to 100° C. for 2 hours or longer in the same form maintained as before being kept under such a condition, without visible curling of the membrane due to heat shrinkage or thermal fusion.

The porous membrane included in the supporting layer may be made from, for example, polyethylene, polypropylene or other polyolefin resins, polytetrafluoroethylene (PTFE), polyvinyl fluoride, polyvinylidene fluoride or other fluorine-containing resins, polyphenylene sulfide, polyether sulfone, polyimide, high molecular weight polyester, heat resistant polyamide, aramid, polycarbonate or other resin materials; or metals, glass, ceramic or other inorganic materials. Among these materials, PTFE, polyvinyl fluoride, polyvinylidene fluoride or other fluorine-containing resins, polyphenylene sulfide, polyether sulfone, polyimide, or ceramic is preferred in terms of water repellency and heat resistance; more preferred is PTFE because it may readily provide micro pore size, and give a high porosity to achieve an increased energy efficiency in gas separation.

The thickness of the porous membrane is not particularly limited. Usually, from the viewpoint of the mechanical strength, the porous membrane preferably has a thickness of 10 μm to 3000 μm, more preferably 10 μm to 500 μm, further preferably 15 μm to 150 μm.

While the average size of pores in the porous membrane is not particularly limited, it is preferably smaller than or equal to 10 μm, more preferably 0.005 μm to 1.0 μm. The porosity of the porous membrane is preferably 5% to 99%, more preferably 30% to 90%.

Surface treatments to the porous membrane, such as corona treatment and plasma treatment, and pore sizes of the porous membrane may be selected, so that the strength of bond between the separation-functional layer and the porous membrane can be controlled. For example, an increase in the strength of corona treatment tends to improve the strength of bond between the layer and the membrane.

(Separation-functional Layer)

The separation-functional layer included in the $CO_2$ gas separation membrane of the present invention may contain, in addition to the crosslinked polymer, the non-crosslinked polymer and the $CO_2$ carrier, a $CO_2$ hydration catalyst. Besides the above-mentioned materials included in the separation-functional layer, a surfactant described below may further be added to the coating liquid used for forming the separation-functional layer of the present invention. Various other additives may also be added to the coating liquid. Examples of the additives include antioxidants and fillers.

The $CO_2$ hydration catalyst is a catalyst that increases the rate of reaction in the $CO_2$ hydration reaction represented by the following formula (2).

$$CO_2 + H_2O \leftrightarrow HCO_3^- + H^+ \quad (2)$$

An overall reaction equation of a reaction between $CO_2$ and the $CO_2$ carrier may be represented by the following formula (3), wherein it is assumed that the $CO_2$ carrier is a carbonate. The above-mentioned $CO_2$ hydration reaction that is one of elementary reactions in the reaction of the formula (3) proceeds at a slow rate under a catalyst-free condition. Thus, the addition of the catalyst accelerates the elementary reaction, thereby accelerating the reaction between $CO_2$ and the $CO_2$ carrier; as a result, the rate of the $CO_2$ permeation is expected to be increased.

$$CO_2 + H_2O + CO_3^{2-} \leftrightarrow 2HCO_3^- \quad (3)$$

Therefore, the inclusion of the $CO_2$ carrier and $CO_2$ hydration catalyst in the separation-functional layer accelerates the reaction between $CO_2$ and the $CO_2$ carrier, and results in significantly improved $CO_2$ permeance and $CO_2$ permselectivity. Since the $CO_2$ hydration catalyst can function effectively even under a high partial pressure of $CO_2$, the $CO_2$ permeance and $CO_2$ permselectivity under a high partial pressure of $CO_2$ may be significantly improved.

As the $CO_2$ hydration catalyst, an oxoacid compound is preferably contained, particularly, an oxoacid compound with at least one element selected from Group 14, 15 and 16 elements is preferably incorporated, and it is further preferred that at least one of a tellurious acid compound, a selenious acid compound, an arsenious acid compound and an orthosilicic acid compound be incorporated. More specifically, potassium tellurite ($K_2TeO_3$, melting point: 465° C.), sodium tellurite ($Na_2TeO_3$, melting point: 710° C.), lithium tellurite ($Li_2O_3Te$, melting point: about 750° C.), potassium selenite ($K_2O_3Se$, melting point: 875° C.), sodium arsenite ($NaO_2As$, melting point: 615° C.), sodium orthosilicate ($Na_4O_4Si$, melting point: 1018° C.) or the like may be suitably used. Among these, a tellurious acid compound is more preferred, and further preferred is potassium tellurite or sodium tellurite.

When the $CO_2$ hydration catalyst has a melting point of higher than or equal to 200° C., the catalyst may be present with thermal stability in the separation-functional layer, and therefore it is possible to maintain the performance of the $CO_2$ gas separation membrane for a long period of time. If the $CO_2$ hydration catalyst is soluble in water, the separation-functional layer that contains the $CO_2$ hydration catalyst may be prepared in an easy and stable manner. When a tellurious acid compound, an arsenious acid compound or a selenious acid compound is used as the $CO_2$ hydration catalyst, it can be expected that the membrane would be provided with improved performance in a stable manner because any of these compounds is soluble in water and has a melting point of higher than or equal to 200° C.

The above-mentioned antioxidant improves the resistance to heat and humidity. Commercially available products of the antioxidant are, for example, dibutylhydroxytoluene (BHT), IRGANOX (registered trademark) 1010 (manufactured by BASF Japan Inc.), IRGANOX (registered trademark) 1035FF (manufactured by BASF Japan Inc.), IRGANOX (registered trademark) 565 (manufactured by BASF Japan Inc.), IRGANOX (registered trademark) L57 (manufactured by BASF Japan Inc.), IRGANOX (registered trademark) 295 (manufactured by BASF Japan Inc.), and others.

The above-mentioned filler may be of any conventionally known type, and may be of organic or inorganic type, as long as the filler has an affinity to the crosslinked polymer or $CO_2$ carrier and does not inhibit the shape-keeping property of the separation-functional layer under high pressures. One or more of such fillers may be used alone or in combination of two or more. When two or more fillers are combined, a combination of organic fillers or of inorganic fillers may be used, or a mixture of organic and inorganic fillers may be used. While the particle size of the filler is not particularly limited, it is desired that the size be 0.1 μm to 5 μm, preferably 0.1 μm to 2 μm, more preferably 0.3 μm to 2 μm in view of preventing defects from occurring. The particle size of the filler can be measured by a light scattering method. When the filler is added to the composition, the filler content is preferably 0.001% by mass to 70% by mass based on the amount of the crosslinked polymer.

(Method for Producing Gas Separation Membrane)

The method for producing a gas separation membrane of the present invention is described in the following. In the first step, a coating liquid is prepared by dissolving, in a medium, a composition for a $CO_2$ separation membrane containing: at least one compound selected from the group consisting of an alkali metal carbonate, an alkali metal bicarbonate, and an alkali metal hydroxide; a crosslinked polymer in which a polymer having a carboxyl group has been crosslinked; and a non-crosslinked polymer obtained by polymerization of one or more monomers selected from the group consisting of vinyl acetate, acrylic acid, methacrylic acid, and a derivative thereof.

Examples of the medium include polar protonic media such as water, methanol, ethanol, 1-propanol, 2-propanol or other alcohols; non-polar media such as toluene, xylene and hexane; and polar aprotic media such as acetone, methyl ethyl ketone, methyl isobutyl ketone or other ketones, N-methylpyrrolidone, N,N-dimethylacetamide and N,N-dimethylformamide. These media may be used alone or in admixture of two or more thereof as long as they are compatible. Among these, preferred media are those containing at least one selected from the group consisting of water, methanol, ethanol, 1-propanol, 2-propanol and other alcohols. More preferred media are those containing water.

When the coating liquid is applied onto the hydrophobic porous membrane, a surfactant may be added to the medium. When a surfactant is added to the medium and the coating liquid is applied onto the porous membrane of the supporting layer, the surfactant is localized at the interface between the porous membrane and the separation-functional layer; through this localization, hydrophobic moieties of the surfactant are adsorbed to the surface of the porous membrane to form a thin layer at the interface between the separation-functional layer and the porous membrane, thereby preventing pass of the $CO_2$ carrier. This stabilizes the performance of the gas separation membrane. Further, the addition of the surfactant may prevent issue of the $CO_2$ carrier in application of the coating liquid onto the porous membrane, and provide improved wettability for the hydrophobic porous membrane, thereby alleviating irregularity in the film thickness or others. The surfactant used in the invention is not particularly limited, and may be of any conventionally known type. Examples of the surfactant include polyoxyethylene-polyoxypropylene glycols, polyoxyethylene alkyl phenyl ethers, polyoxyethylene alkyl ethers, fluorochemical surfactants, and silicone surfactants. These surfactants may be used alone or in combination of two or more thereof.

If the coating liquid having no surfactant added thereto is applied onto the hydrophobic porous membrane, the above-mentioned surfactant may be applied onto the surface of the hydrophobic porous membrane in advance.

In the second step, a coating film is formed by applying the prepared coating liquid onto one surface of the porous membrane. The temperature of the coating liquid in the application step can be selected as appropriate in accordance with the composition or concentration of the liquid. If the temperature is excessively high, however, a large amount of the medium may be vaporized from the coating liquid and the composition and concentration of the liquid may be changed, or a scar left by vaporization may persist on the coating film. Therefore, the temperature of the coating liquid is preferably higher than or equal to room temperature and lower than or equal to a temperature 5° C. below the boiling point of the medium to be employed. For example, if water is employed as the medium, it is preferred that the coating liquid be applied onto the porous membrane at a temperature of 15° C. to 95° C.

The coating liquid can be applied onto the porous membrane by any method that is not particularly limited. Examples of such application method include spin coating, bar coating, die coating, blade coating, air knife coating, gravure coating, roll coating, spray coating, dip coating, comma roll coating, kiss coating, screen printing and ink jet printing. The coating liquid is preferably applied in an amount such that the coating weight (solid weight per unit area) is 1 g/m$^2$ to 1000 g/m$^2$, more preferably 5 g/m$^2$ to 750 g/m$^2$, further preferably 10 g/m$^2$ to 500 g/m$^2$. The coating weight can be controlled by regulating the rate of forming a coating film (for example, the rate of conveying a breathable support), the concentration of the coating liquid, the discharge amount of the coating liquid, and others. The coating liquid may be applied in a pattern of stripes or dots.

In the third step, the medium is removed from the formed coating film. The medium can be removed by any method that is not particularly limited. While any conventionally known method may be used to remove the medium, it is preferred to employ such a method that the coating film is dried by forced-air drying with heated air, for example, to remove the medium by evaporation. For example, the coating material applied is conveyed into a forced-air dryer set at a predetermined temperature and a predetermined humidity to remove the medium from the coating film by evaporation. The separation-functional layer is formed by this step.

The drying temperature may be selected as appropriate according to the medium of the coating liquid and the type of the porous membrane. Usually, it is preferred that the drying temperature be higher than the freezing point of the medium and lower than the melting point of the porous membrane. Generally, a suitable temperature is 80° C. to 200° C.

The medium removal operation is performed until the concentration of the medium in the coating film is decreased to a predetermined concentration or lower. Specifically, it is preferred that the removal operation be performed until the medium content in the separation-functional layer reaches 1% by weight to 34% by weight as obtained in the third step.

The film thickness of the separation-functional layer is selected as appropriate according to the required separation performance. Usually, the film thickness is preferably 0.1 μm to 600 μm, more preferably 0.5 μm to 400 μm, especially preferably 1 μm to 200 μm.

(Separation Membrane Module)

The $CO_2$ gas separation membrane module utilizing the gas separation membrane of the present invention may be of any type such as spiral-wound type, tube type, hollow fiber type, pleated type, and plate-and-frame type. FIG. 1 shows a schematic view with partial cutaway showing a structure of a spiral $CO_2$ gas separation membrane module including the gas separation membrane of the present invention.

A spiral-wound $CO_2$ gas separation membrane module M shown in FIG. 1 has a structure in which a laminate 2 is plurally wrapped around an outer periphery of a hollow gas-collecting tube 3 with a plurality of holes 31 formed therein, laminate 2 including a $CO_2$ gas separation membrane 21, a feed-side channel member 22 and a permeate-side channel member 23 in a laminated manner. It is preferred that feed-side channel member 22 and permeate-side channel member 23 have the capability of accelerating turbulent flow of a gas mixture fed containing $CO_2$ and water vapor and a permeate gas that has permeated through $CO_2$ gas separation membrane 21 (surface renewal of the membrane surface) to increase the rate of permeation of $CO_2$ in the fed fluid through the membrane; and the capability of minimizing pressure drop at the feed side. Feed-side channel member 22 and permeate-side channel member 23 that are of mesh type may be suitably employed because these members preferably have the capability of serving as a spacer and the capability of generating turbulent flow in the gas mixture. The unit cell of the mesh may have a shape selected from, for example, rhombus, parallelogram and others according to the intended use, considering that the flow path of the gas mixture may be changed by the shape of the mesh. While feed-side channel member 22 and permeate-side channel member 23 may be made from any material that is not particularly limited, it is preferred that a heat-resistant material be employed because the gas separation membrane of the present invention will be used under a temperature condition of higher than or equal to 100° C. The same materials as those of the porous membrane listed above are preferably employed for the feed-side and permeate-side channel members.

(Method for Separating $CO_2$)

In spiral-wound $CO_2$ gas separation membrane module M of the above-mentioned structure, the gas mixture containing $CO_2$ and water vapor is fed through an inlet 24 provided in $CO_2$ gas separation membrane module M in the direction of arrow A, and during flowing through feed-side channel member 22, $CO_2$ in the gas mixture permeates through $CO_2$ gas separation membrane 21; and the permeated $CO_2$ is collected in gas-collecting tube 3, and is then recovered through an outlet 32 of gas-collecting tube 3. The retentate gas mixture, from which $CO_2$ has been separated, passes through a space of feed-side channel member 22, and is discharged from an outlet 25 of $CO_2$ gas separation membrane module M. A sweep gas selected from inert gases or others may be fed to gas-collecting tube 3.

EXAMPLES

The present invention is further illustrated, but is not to be construed as limited, by the following examples.

Example 1

A vessel was charged with 188 g of water, 4 g of a crosslinked polyacrylic acid ("AQUPEC HV-501" manufactured by SUMITOMO SEIKA CHEMICALS CO., LTD.) used as a crosslinked polymer, 0.8 g of a polyacrylic acid ("AQUPAANA AP-40F", 40% Na saponification, manufactured by SUMITOMO SEIKA CHEMICALS CO., LTD.) used as a non-crosslinked polymer and 10.5 g of cesium hydroxide monohydrate. This mixture was stirred to carry out a neutralization reaction (neutralization step). After completion of the neutralization reaction, 10 g of cesium carbonate and 1.2 g of a surfactant ("Surflon S-242" manufactured by AGC Seimi Chemical Co., Ltd.) were added to the reaction product and then mixed to prepare coating liquid I (coating liquid preparation step).

The prepared coating liquid I was applied onto the surface of a hydrophobic PTFE porous membrane ("POREFLON HP-010-50", membrane thickness: 50 μm, pore size: 0.1 μm, manufactured by Sumitomo Electric Fine Polymer, Inc.). Subsequently, the hydrophobic PTFE porous membrane with the coating liquid applied thereon was dried at a temperature of about 120° C. for about 5 minutes to obtain a gas separation membrane having a $CO_2$ separation-functional layer formed on the hydrophobic PTFE porous membrane. The process of applying and drying the coating liquid was further repeated several times to obtain sheet-like gas separation membrane I (membrane forming step). The $CO_2$ separation performance of the obtained gas separation membrane I was evaluated by the following method. The results are shown in Table 2.

Example 2

Gas separation membrane II was obtained in the same manner as in Example 1 except that 1.5 g of potassium tellurite, besides the cesium carbonate and surfactant, was added in the coating liquid preparation step of Example 1 to prepare coating liquid II. The $CO_2$ separation performance of the obtained gas separation membrane II was evaluated by the following method. The results are shown in Table 2.

Example 3

Gas separation membrane III was obtained in the same manner as in Example 2 except that the amount of cesium carbonate added was increased to 16 g in the coating liquid preparation step of Example 2 to prepare coating liquid III. The $CO_2$ separation performance of the obtained gas separation membrane III was evaluated by the following method. The results are shown in Table 2.

Example 4

Gas separation membrane IV was obtained in the same manner as in Example 3 except that a crosslinked polyacrylic acid available from a different manufacturer ("SANFRESH ST-500MPSA" manufactured by Sanyo Chemical Industries, Ltd.) was used instead of the crosslinked polyacrylic acid ("AQUPEC HV-501" manufactured by SUMITOMO SEIKA CHEMICALS CO., LTD.), and the amount of cesium carbonate added was increased to 20 g in the coating liquid preparation step of Example 3 to prepare coating liquid IV. The $CO_2$ separation performance of the obtained gas separation membrane IV was evaluated by the following method. The results are shown in Table 2.

Comparative Example 1

A vessel was charged with 34 g of water, 50 g of an aqueous solution containing 5 wt % PVA (manufactured by Aldrich, molecular weight: 180000, saponification rate: 99%) and 0.7 g of an epoxy crosslinking agent ("EX-810" manufactured by Nagase ChemteX Corporation). A crosslinking reaction was carried out by stirring this mixture at 95° C. for 60 minutes to prepare a crosslinked polymer. After completion of the crosslinking reaction, 15 g of an aqueous solution containing 40 wt % cesium carbonate was added dropwise to prepare coating liquid V.

Subsequently, the prepared coating liquid V was used to obtain gas separation membrane V through the same membrane forming step as that of Example 1. The $CO_2$ separation performance of the obtained gas separation membrane V was evaluated by the following method. The results are shown in Table 2.

Comparative Example 2

A vessel was charged with 188 g of water, 4 g of a crosslinked polyacrylic acid ("AQUPEC HV-501" manufactured by SUMITOMO SEIKA CHEMICALS CO., LTD.) used as a crosslinked polymer and 9.3 g of cesium hydroxide monohydrate. This mixture was stirred to carry out a neutralization reaction (neutralization step). After completion of the neutralization reaction, 9.0 g of cesium carbonate and 1.2 g of a surfactant ("Surflon S-242" manufactured by AGC Seimi Chemical Co., Ltd.) were added to the reaction product and then mixed to prepare coating liquid VI (coating liquid preparation step).

The prepared coating liquid VI was applied onto the surface of a hydrophobic PTFE porous membrane ("POREFLON HP-010-50", membrane thickness: 50 μm, pore size: 0.1 μm, manufactured by Sumitomo Electric Fine Polymer, Inc.). Subsequently, the hydrophobic PTFE porous membrane with the coating liquid applied thereon was dried at a temperature of about 120° C. for about 5 minutes to obtain a gas separation membrane having a $CO_2$ separation-functional layer formed on the hydrophobic PTFE porous membrane. The process of applying and drying the coating liquid was further repeated several times to obtain sheet-like gas separation membrane VI (membrane forming step). The $CO_2$ separation performance of the obtained gas separation membrane VI was evaluated by the following method. The results are shown in Table 2.

Comparative Example 3

Gas separation membrane VII was obtained in the same manner as in Comparative Example 2 except that 1.5 g of potassium tellurite, besides the cesium carbonate and surfactant, was added in the coating liquid preparation step of Comparative Example 2 to prepare coating liquid VII. The $CO_2$ separation performance of the obtained gas separation membrane VII was evaluated by the following method. The results are shown in Table 2.

Example 5

A vessel was charged with 188 g of water, 2.4 g of a crosslinked polyacrylic acid ("AQUPEC HV-501" manufactured by SUMITOMO SEIKA CHEMICALS CO., LTD.) used as a crosslinked polymer, 2.4 g of a polyacrylic acid ("AQUPAANA AP-40F", 40% Na saponification, manufactured by SUMITOMO SEIKA CHEMICALS CO., LTD.) used as a non-crosslinked polymer and 10.5 g of cesium hydroxide monohydrate. This mixture was stirred to carry out a neutralization reaction (neutralization step). After completion of the neutralization reaction, 10.5 g of cesium hydroxide monohydrate, 1.5 g of potassium tellurite and 1.2 g of a surfactant ("Surflon S-242" manufactured by AGC Seimi Chemical Co., Ltd.) were added to the reaction product and then mixed to prepare coating liquid VIII (coating liquid preparation step).

The prepared coating liquid VIII was applied onto the surface of a hydrophobic PTFE porous membrane ("POREFLON HP-010-50", membrane thickness: 50 μm, pore size: 0.1 μm, manufactured by Sumitomo Electric Fine Polymer, Inc.). Subsequently, the hydrophobic PTFE porous membrane with the coating liquid applied thereon was dried at a temperature of about 120° C. for about 5 minutes to obtain gas separation membrane VIII having a $CO_2$ separation-functional layer formed on the hydrophobic PTFE porous membrane. The process of applying and drying the coating liquid was further repeated several times to obtain sheet-like gas separation membrane VIII (membrane forming step). The film-forming property of the obtained gas separation membrane VIII was evaluated by the following method. The results are shown in Table 3.

Example 6

Gas separation membrane IX was obtained in the same manner as in Example 5 except that the amount of crosslinked polyacrylic acid ("AQUPEC HV-501" manufactured by SUMITOMO SEIKA CHEMICALS CO., LTD.) added as a crosslinked polymer was increased to 4.3 g, and the amount of polyacrylic acid ("AQUPAANA AP-40F", 40% Na saponification, manufactured by SUMITOMO SEIKA CHEMICALS CO., LTD.) added as a non-crosslinked polymer was decreased to 0.5 g in the coating liquid preparation step of Example 5 to prepare coating liquid IX. The film-forming property of the obtained gas separation membrane IX was evaluated by the following method. The results are shown in Table 3.

Example 7

Gas separation membrane X was obtained in the same manner as in Example 5 except that the amount of crosslinked polyacrylic acid ("AQUPEC HV-501" manufactured by SUMITOMO SEIKA CHEMICALS CO., LTD.) added as a crosslinked polymer was decreased to 0.5 g, and the amount of polyacrylic acid ("AQUPAANA AP-40F", 40% Na saponification, manufactured by SUMITOMO SEIKA CHEMICALS CO., LTD.) added as a non-crosslinked polymer was increased to 4.3 g in the coating liquid preparation step of Example 5 to prepare coating liquid X. The film-forming property of the obtained gas separation membrane X was evaluated by the following method. The results are shown in Table 3.

Example 8

A vessel was charged with 188 g of water, 4.0 g of a crosslinked polyacrylic acid ("AQUPEC HV-501" manufactured by SUMITOMO SEIKA CHEMICALS CO., LTD.) used as a crosslinked polymer, 0.8 g of a polyacrylic acid ("AQUPAANA AP-40F", 40% Na saponification, manufactured by SUMITOMO SEIKA CHEMICALS CO., LTD.) used as a non-crosslinked polymer and 10.5 g of cesium hydroxide monohydrate. This mixture was stirred to carry out a neutralization reaction (neutralization step). After completion of the neutralization reaction, 21.0 g of cesium hydroxide monohydrate, 1.5 g of potassium tellurite, and 1.2 g of a surfactant ("Surflon S-242" manufactured by AGC Seimi Chemical Co., Ltd.) were added to the reaction product and then mixed to prepare coating liquid XI (coating liquid preparation step).

The prepared coating liquid XI was applied onto the surface of a hydrophobic PTFE porous membrane ("POREFLON HP-010-50", membrane thickness: 50 μm, pore size: 0.1 μm, manufactured by Sumitomo Electric Fine Polymer, Inc.). Subsequently, the hydrophobic PTFE porous membrane with the coating liquid applied thereon was dried at a temperature of about 120° C. for about 5 minutes to obtain gas separation membrane XI having a $CO_2$ separation-functional layer formed on the hydrophobic PTFE porous membrane. The process of applying and drying the coating liquid was further repeated several times to obtain sheet-like gas separation membrane XI (membrane forming step). The film-forming property of the obtained gas separation membrane XI was evaluated by the following method. The results are shown in Table 3.

Example 9

A vessel was charged with 188 g of water, 4 g of a crosslinked polyacrylic acid ("AQUPEC HV-501" manufactured by SUMITOMO SEIKA CHEMICALS CO., LTD.) used as a crosslinked polymer, 0.8 g of a polyacrylic acid ("AQUPAANA AP-40F", 40% Na saponification, manufactured by SUMITOMO SEIKA CHEMICALS CO., LTD.) used as a non-crosslinked polymer and 10.5 g of cesium hydroxide monohydrate. This mixture was stirred to carry out a neutralization reaction (neutralization step). After completion of the neutralization reaction, 10 g of cesium carbonate, 1.5 g of potassium tellurite, 1.0 g of lithium carbonate and 1.2 g of a surfactant ("Surflon S-242" manufactured by AGC Seimi Chemical Co., Ltd.) were added to the reaction product and then mixed to prepare coating liquid XII (coating liquid preparation step).

The prepared coating liquid XII was applied onto the surface of a hydrophobic PTFE porous membrane ("POREFLON HP-010-50", membrane thickness: 50 μm, pore size: 0.1 μm, manufactured by Sumitomo Electric Fine Polymer, Inc.). Subsequently, the hydrophobic PTFE porous membrane with the coating liquid applied thereon was dried at a temperature of about 120° C. for about 5 minutes to obtain gas separation membrane XII having a $CO_2$ separation-functional layer formed on the hydrophobic PTFE porous membrane. The process of applying and drying the coating liquid was further repeated several times to obtain sheet-like gas separation membrane XII (membrane forming step).

The resultant gas separation membrane XII and gas separation membrane II obtained in Example 2 were evaluated for durability of $CO_2$ separation performance by the following method. The results are shown in Table 4.

(Evaluation of Film-forming Property)

Figure 2:
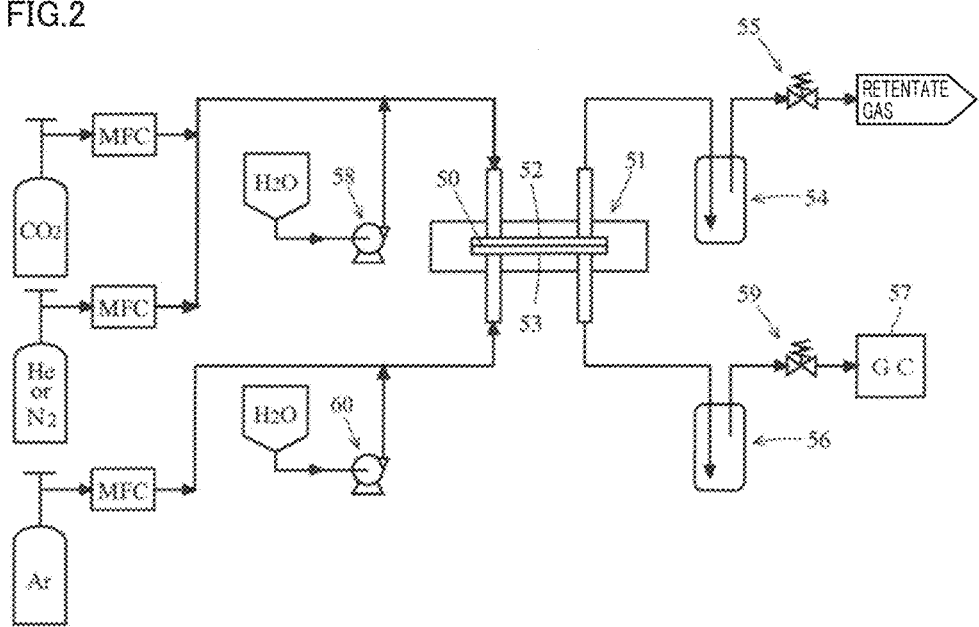
FIG. 2 is a schematic view showing a $CO_2$ gas separation apparatus including a $CO_2$ gas separation membrane module used in examples.

Evaluation of $N_2$ gas permeability was conducted using a $CO_2$ gas separation apparatus including a $CO_2$ gas separation membrane module 51 as shown in FIG. 2. Specifically, gas separation membranes I and VI prepared in Example 1 and Comparative Example 2, respectively, were cut into pieces of appropriate size to form flat membranes, and each of these membranes was fixed between a feed side 52 and a permeation side 53 of stainless-steel $CO_2$ separation membrane module 51.

$N_2$ gas at room temperature was fed to feed side 52 of $CO_2$ gas separation membrane module 51, and then the pressure on feed side 52 was increased to 900 kPaA. The pressure on permeate side 53 was controlled at atmospheric pressure. $N_2$ permeance was calculated based on temporal change in the pressure on feed side 52. Each ten samples of the gas separation membrane of Example 1 and those of Comparative Example 2 were evaluated for their film-forming property, and the samples were graded as acceptable when $N_2$ permeance (mol/$m^2$s kPa) was lower than or equal to $5\times10^{-8}$ mol/$m^2$s kPa. The results are shown in Table 1.

TABLE 1

| | Acceptance ratio % (Acceptable samples/Tested samples) |
|---|---|
| Example 1 | 100 (10/10) |
| Comparative Example 2 | 70 (7/10) |

(Evaluation of $CO_2$ Separation Performance)

$CO_2$ separation was performed using a $CO_2$ gas separation apparatus including $CO_2$ gas separation membrane module 51 as shown in FIG. 2. Specifically, gas separation membranes I to VII prepared in Examples 1 to 4 and Comparative Examples 1 to 3, respectively, were cut into pieces of appropriate size to form flat membranes, and each of these membranes was fixed between feed side 52 and permeation side 53 of stainless-steel $CO_2$ separation membrane module 51.

A raw gas ($CO_2$: 34.5%, $N_2$: 52.8%, $H_2O$: 12.7%) was fed to feed side 52 of $CO_2$ gas separation membrane module 51 at a flow rate of $7.16\times10^{-2}$ mol/min, and a sweep gas (Ar: 28.9%, $H_2O$: 71.1%) was fed to permeate side 53 of $CO_2$ gas separation membrane module 51 at a flow rate of $1.05\times10^{-2}$ mol/min. It should be noted that the gas blend ratios and the flow rates were adjusted by introducing water via fluid-forwarding metering pumps 58 and 60, followed by heating and evaporating the water, to give the $H_2O$ ratios and flow rates as mentioned above. The pressure on feed side 52 was controlled at 900 kPaA by a back-pressure controller 55 provided on the downstream side of a cold trap 54 located about midway in a discharge passage for discharging retentate gas. In addition, a back-pressure controller 59 was provided between a cold trap 56 and a gas chromatograph 57, and was used to control the pressure on permeate side 53 at atmospheric pressure. The flow rate of gas after removal of water vapor by cold trap 56 from the sweep gas discharged through permeate side 53 was quantified based on results of analysis with gas chromatograph 57 to calculate $CO_2$ permeance and $N_2$ permeance (mol/$m^2$s kPa) regarding $CO_2$ and $N_2$ contained in the permeate gas. The obtained permeance ratio was used to evaluate selectivity.

It should be noted that $CO_2$ gas separation membrane module 51 and pipes for feeding raw gas and sweep gas to the $CO_2$ gas separation membrane module were disposed in a thermostatic chamber (not shown) set at a predetermined temperature in order to maintain $CO_2$ gas separation membrane module 51 and these gases at constant temperature. This evaluation of $CO_2$ separation performance was conducted under conditions that the temperature of $CO_2$ gas separation membrane module 51 and those of raw and sweep gases were maintained at 110° C.

TABLE 2

| | Crosslinked polymer | | Non-crosslinked polymer | | | $CO_2$ carrier | Amount added g-$CO_2$ carrier/ |
|---|---|---|---|---|---|---|---|
| | Type | Viscosity mPa·s | Type | Viscosity mPa·s | Content Wt % | Type | (g-crosslinked polymer + g-non-crosslinked polymer) |
| Example 1 | Polyacrylic acid | 4300 | Polyacrylic acid | 900 | 17 | $Cs_2CO_3$ | 2.2 |
| Example 2 | Polyacrylic acid | 4300 | Polyacrylic acid | 900 | 17 | $Cs_2CO_3$ | 2.2 |
| Example 3 | Polyacrylic acid | 4300 | Polyacrylic acid | 900 | 17 | $Cs_2CO_3$ | 3.3 |
| Example 4 | Polyacrylic acid | 1400 | Polyacrylic acid | 900 | 17 | $Cs_2CO_3$ | 4.4 |
| Comparative Example 1 | Polyvinyl alcohol | — | — | — | 0 | $Cs_2CO_3$ | 2.4 |
| Comparative Example 2 | Polyacrylic acid | 4300 | — | — | 0 | $Cs_2CO_3$ | 2.3 |
| Comparative Example 3 | Polyacrylic acid | 4300 | — | — | 0 | $Cs_2CO_3$ | 2.3 |

| | Amount of alkali metal cation Mole equivalent | $CO_2$ hydration catalyst | | $CO_2$ permeance mol/($m^2$ s kPa) | $CO_2/N_2$ selectivity |
|---|---|---|---|---|---|
| | | Type | Amount added g-catalyst/ (g-crosslinked polymer + g-non-crosslinked polymer) | | |
| Example 1 | 2 | — | — | $1.56 \times 10^{-5}$ | 258 |
| Example 2 | 2 | $K_2TeO_3$ | 0.36 | $2.90 \times 10^{-5}$ | 642 |
| Example 3 | 2.5 | $K_2TeO_3$ | 0.36 | $3.44 \times 10^{-5}$ | 1062 |
| Example 4 | 3 | $K_2TeO_3$ | 0.36 | $2.85 \times 10^{-5}$ | 864 |
| Comparative Example 1 | — | — | — | $0.74 \times 10^{-5}$ | 20 |

TABLE 2-continued

| | | | | | |
|---|---|---|---|---|---|
| Comparative Example 2 | 2 | — | — | $1.56 \times 10^{-5}$ | 30 |
| Comparative Example 3 | 2 | $K_2TeO_3$ | 0.36 | $1.90 \times 10^{-5}$ | 43 |

(Evaluation of Film-forming Property)

Evaluation of $N_2$ gas permeability was conducted using a $CO_2$ gas separation apparatus including $CO_2$ gas separation membrane module 51 as shown in FIG. 2. Specifically, gas separation membranes I, VIII, IX, X, XI and VI prepared in Examples 1, 5, 6, 7 and 8 and Comparative Example 2, respectively, were cut into pieces of appropriate size to form flat membranes, and each of these membranes was fixed between feed side 52 and permeate side 53 of stainless-steel $CO_2$ separation membrane module 51.

$N_2$ gas at room temperature was fed to feed side 52 of $CO_2$ gas separation membrane module 51, and then the pressure on feed side 52 was increased to 900 kPaA. The pressure on permeate side 53 was controlled at atmospheric pressure. $N_2$ permeance was calculated based on temporal change in the pressure on feed side 52. Each ten samples of the above-mentioned gas separation membranes were evaluated for their film-forming property, and the samples were graded as acceptable when $N_2$ permeance (mol/m²s kPa) was lower than or equal to $5 \times 10^{-8}$ mol/m²s kPa. The results are shown in Table 3.

tively, were cut into pieces of appropriate size to form flat membranes, and each of these membranes was fixed between feed side 52 and permeate side 53 of stainless-steel $CO_2$ separation membrane module 51.

A raw gas ($CO_2$: 34.5%, $N_2$: 52.8%, $H_2O$: 12.7%) was fed to feed side 52 of $CO_2$ gas separation membrane module 51 at a flow rate of $7.16 \times 10^{-2}$ mol/min, and a sweep gas (Ar: 28.9%, $H_2O$: 71.1%) was fed to permeate side 53 of $CO_2$ separation membrane module 51 at a flow rate of $1.05 \times 10^{-2}$ mol/min. It should be noted that the gas blend ratios and the flow rates were adjusted by introducing water via fluid-forwarding metering pumps 58 and 60, followed by heating and evaporating the water, to give the $H_2O$ ratios and flow rates as mentioned above. The pressure on feed side 52 was controlled at 900 kPaA by back-pressure controller 55 provided on the downstream side of cold trap 54 located about midway in a discharge passage for discharging retentate gas. In addition, back-pressure controller 59 was provided between cold trap 56 and gas chromatograph 57, and was used to control the pressure on permeate side 53 at atmospheric pressure. The flow rate of gas after removal of

TABLE 3

| | Crosslinked polymer | | Non-crosslinked polymer | | | $CO_2$ carrier | |
|---|---|---|---|---|---|---|---|
| | Type | Viscosity mPa·s | Type | Viscosity mPa·s | Content Wt % | Type | Amount added g-$CO_2$ carrier/ (g-crosslinked polymer + g-non-crosslinked polymer) |
| Example 1 | Polyacrylic acid | 4300 | Polyacrylic acid | 900 | 17 | $Cs_2CO_3$ | 2.2 |
| Example 5 | Polyacrylic acid | 4300 | Polyacrylic acid | 900 | 50 | CsOH | 2.2 |
| Example 6 | Polyacrylic acid | 4300 | Polyacrylic acid | 900 | 90 | CsOH | 2.2 |
| Example 7 | Polyacrylic acid | 4300 | Polyacrylic acid | 900 | 10 | CsOH | 2.2 |
| Example 8 | Polyacrylic acid | 4300 | Polyacrylic acid | 900 | 17 | CsOH | 2.2 |
| Comparative Example 2 | Polyacrylic acid | 4300 | — | — | 0 | $Cs_2CO_3$ | 2.3 |

| | Amount of alkali metal cation Mole equivalent | $CO_2$ hydration catalyst | | Acceptance ratio % (Acceptable samples/ Tested samples) |
|---|---|---|---|---|
| | | Type | Amount added g-catalyst/ (g-crosslinked polymer + g-non-crosslinked polymer) | |
| Example 1 | 2 | — | — | 100 (10/10) |
| Example 5 | 2 | $K_2TeO_3$ | 0.36 | 100 (10/10) |
| Example 6 | 2 | $K_2TeO_3$ | 0.36 | 100 (10/10) |
| Example 7 | 2 | $K_2TeO_3$ | 0.36 | 100 (10/10) |
| Example 8 | 3 | $K_2TeO_3$ | 0.36 | 100 (10/10) |
| Comparative Example 2 | 2 | — | — | 70 (7/10) |

(Evaluation of Durability of $CO_2$ Separation Performance)

$CO_2$ separation was performed using a $CO_2$ gas separation apparatus including $CO_2$ gas separation membrane module 51 as shown in FIG. 2. Specifically, gas separation membranes II and XII prepared in Examples 2 and 9, respecwater vapor by cold trap 56 from the sweep gas discharged through permeate side 53 was quantified based on results of analysis with gas chromatograph 57 to calculate $CO_2$ permeance and $N_2$ permeance (mol/m²s kPa) regarding $CO_2$ and $N_2$ contained in the permeate gas. The obtained permeance ratio was used to evaluate selectivity. The percentages of the $CO_2$ permeance and $CO_2$ selectivity 500 hours after initiation of $CO_2$ separation (rates of endurance) were calculated, with those 1.5 hours after initiation of $CO_2$ separation being 100%.

It should be noted that $CO_2$ gas separation membrane module 51 and pipes for feeding raw gas and sweep gas to the $CO_2$ gas separation membrane module were disposed in a thermostatic chamber set at a predetermined temperature in order to maintain $CO_2$ gas separation membrane module 51 and these gases at constant temperature. This evaluation of durability of $CO_2$ separation performance was conducted under conditions that the temperature of $CO_2$ gas separation membrane module 51 and those of raw and sweep gases were maintained at 110° C.

It was shown that, when the separation-functional layer contained lithium carbonate, there was a tendency for the membrane to exhibit an improved rate of endurance in the $CO_2$ permeance and $CO_2$ permselectivity after a lapse of 500 hours.

TABLE 4

| | Addition of lithium carbonate | Rate of endurance after a lapse of 500 hr | |
|---|---|---|---|
| | | $CO_2$ permeation performance | $CO_2$ selectivity |
| Example 2 | No | 91% | 89% |
| Example 9 | Yes | 96% | 94% |

INDUSTRIAL APPLICABILITY

The gas separation membrane according to the present invention has excellent film-forming property as well as excellent $CO_2$ permeance and $CO_2$ permselectivity, and can be utilized to separate $CO_2$ from a $CO_2$-containing gas mixture at a high permselectivity coefficient, for example, in a decarbonation step of large-scale processes such as hydrogen or urea production, or in a $CO_2$-permeable membrane reactor.

REFERENCE SIGNS LIST

2 Laminate
3 Gas-collecting tube
M Spiral $CO_2$ gas separation membrane module
21 $CO_2$ gas separation membrane
22 Feed-side channel member
23 Permeate-side channel member
24 Inlet
25 Outlet
32 Outlet
51 $CO_2$ gas separation membrane module (52: Feed side, 53: Permeate side)
54, 56 Cold trap
55, 59 Back-pressure controller
57 Gas chromatograph
58, 60 Fluid-forwarding pump

The invention claimed is:

1. A method for separating $CO_2$, comprising:
feeding a gas mixture that contains at least $CO_2$ and water vapor on a surface side of a $CO_2$ gas separation membrane; and
separating $CO_2$ from said gas mixture through the other surface side of said gas separation membrane, wherein the $CO^2$ gas separation membrane comprises a separation-functional layer containing a composition for a $CO_2$ gas separation membrane; and
a supporting layer including a porous membrane, wherein the composition for a $CO_2$ gas separation membrane comprises at least one compound selected from the group consisting of an alkali metal carbonate, an alkali metal bicarbonate, and an alkali metal hydroxide;
a crosslinked polymer in which a polymer having a carboxyl group has been crosslinked; and
a non-crosslinked polymer obtained by polymerization of one or more monomers selected from the group consisting of vinyl acetate, acrylic acid, methacrylic acid, and a derivative thereof,
wherein the non-crosslinked polymer content is 2 wt % to 90 wt % based on the total amount of the crosslinked polymer and the non-crosslinked polymer.

2. A $CO_2$ gas separation membrane module comprising a spiral-wound element having a structure wherein a laminate is wrapped around an outer periphery of a hollow gas-collecting tube with a plurality of holes formed in a wall surface of the tube, the laminate including a $CO_2$ gas separation membrane, a feed-side channel member serving as a flow channel for a gas component to be fed, and a permeation-side channel member serving as a flow channel for a gas component that has permeated through the $CO_2$ gas separation membrane, wherein
the $CO_2$ gas separation membrane comprises a separation-functional layer containing a composition for the $CO_2$ gas separation membrane; and
a supporting layer including a porous membrane, wherein the composition for a $CO_2$ gas separation membrane comprises at least one compound selected from the group consisting of an alkali metal carbonate, an alkali metal bicarbonate, and an alkali metal hydroxide;
a crosslinked polymer in which a polymer having a carboxyl group has been crosslinked; and
a non-crosslinked polymer obtained by polymerization of one or more monomers selected from the group consisting of vinyl acetate, acrylic acid, methacrylic acid, and a derivative thereof,
wherein the non-crosslinked polymer content is 2 wt % to 90 wt % based on the total amount of the crosslinked polymer and the non-crosslinked polymer.

3. A $CO_2$ gas separation apparatus comprising:
the $CO_2$ separation membrane module according to claim 2; and
a gas feeding part for feeding a gas mixture that contains at least $CO_2$ and water vapor to said $CO_2$ separation membrane module.

4. The $CO_2$ gas separation membrane module according to claim 2, wherein
the non-crosslinked polymer content is 2 wt % to 80 wt % based on the total amount of the crosslinked polymer and the non-crosslinked polymer.

5. A composition for a $CO_2$ gas separation membrane comprising:
at least one compound selected from the group consisting of an alkali metal carbonate, an alkali metal bicarbonate, and an alkali metal hydroxide;
a crosslinked polymer in which a polymer having a carboxyl group has been crosslinked;
a non-crosslinked polymer obtained by polymerization of one or more monomers selected from the group consisting of vinyl acetate, acrylic acid, methacrylic acid, and a derivative thereof; and
a $CO_2$ hydration catalyst.

6. A method for separating $CO_2$, comprising:
feeding a gas mixture that contains at least $CO_2$ and water vapor on a surface side of the $CO_2$ gas separation membrane; and
separating $CO_2$ from said gas mixture through the other surface side of said gas separation membrane, wherein
the $CO_2$ gas separation membrane comprises a separation-functional layer containing a composition for a $CO_2$ gas separation membrane; and
a supporting layer including a porous membrane, wherein
the composition for a $CO_2$ gas separation membrane comprises at least one compound selected from the group consisting of an alkali metal carbonate, an alkali metal bicarbonate, and an alkali metal hydroxide;
a crosslinked polymer in which a polymer having a carboxyl group has been crosslinked; and
a non-crosslinked polymer obtained by polymerization of one or more monomers selected from the group consisting of vinyl acetate, acrylic acid, methacrylic acid, and a derivative thereof.

7. A $CO_2$ gas separation membrane module comprising
a spiral-wound element having a structure wherein a laminate is wrapped around an outer periphery of a hollow gas-collecting tube with a plurality of holes formed in a wall surface of the tube, the laminate including a $CO_2$ gas separation membrane, a feed-side channel member serving as a flow channel for a gas component to be fed, and a permeation-side channel member serving as a flow channel for a gas component that has permeated through the $CO_2$ gas separation membrane, wherein
the $CO_2$ gas separation membrane comprises a separation-functional layer containing a composition for a $CO_2$ gas separation membrane; and
a supporting layer including a porous membrane, wherein
the composition for a $CO_2$ gas separation membrane comprises at least one compound selected from the group consisting of an alkali metal carbonate, an alkali metal bicarbonate, and an alkali metal hydroxide;
a crosslinked polymer in which a polymer having a carboxyl group has been crosslinked; and
a non-crosslinked polymer obtained by polymerization of one or more monomers selected from the group consisting of vinyl acetate, acrylic acid, methacrylic acid, and a derivative thereof.

8. A $CO_2$ gas separation apparatus comprising:
the $CO_2$ separation membrane module according to claim 7; and
a gas feeding part for feeding a gas mixture that contains at least $CO_2$ and water vapor to said $CO_2$ separation membrane module.

9. The $CO_2$ gas separation membrane module according to claim 2, wherein
the non-crosslinked polymer comprises a structural unit having one or more functional groups selected from the group consisting of a carboxyl group, a hydroxy group and a carbamoyl group, and the structural unit has a total content of 50 mol % to 100 mol % based on the total amount of all structural units included in the non-crosslinked polymer.

10. The $CO_2$ gas separation membrane module according to claim 2, wherein
the crosslinked polymer in which a polymer having a carboxyl group has been crosslinked comprises a structural unit derived from acrylic acid, methacrylic acid, or a derivative thereof.

11. The $CO_2$ gas separation membrane module according to claim 2, wherein
the at least one compound selected from the group consisting of an alkali metal carbonate, an alkali metal bicarbonate, and an alkali metal hydroxide is a carbonate, bicarbonate or hydroxide of at least one alkali metal selected from the group consisting of Na, K, Rb and Cs.

12. The $CO_2$ gas separation membrane module according to claim 2, wherein
the at least one compound selected from the group consisting of an alkali metal carbonate, an alkali metal bicarbonate, and an alkali metal hydroxide is cesium carbonate or cesium hydroxide.

13. The $CO_2$ gas separation membrane module according to claim 11, wherein
the composition further comprises lithium carbonate or lithium hydroxide.

14. The $CO_2$ gas separation membrane module according to claim 2, wherein
the composition further comprises a $CO_2$ hydration catalyst.

15. The $CO_2$ gas separation membrane module according to claim 2, wherein
the composition comprises totally 1 mole equivalent to 6 mole equivalents of alkali metal cations based on the total amount of the carboxyl group and carboxylate included in said crosslinked polymer and said non-crosslinked polymer.

16. The $CO_2$ gas separation membrane module according to claim 2, wherein
said porous membrane is made from at least one material selected from the group consisting of ceramic, a fluorine-containing resin, polyphenylene sulfide, polyether sulfone, and polyimide.

17. The $CO_2$ gas separation membrane module according to claim 2, wherein
said porous membrane has pores with an average pore diameter of 0.005 um to 1.0 um.

18. The $CO_2$ gas separation membrane module according to claim 2, prepared by a process comprising the steps of:
preparing a coating liquid by dissolving, in a medium, a composition for a $CO_2$ separation membrane comprising: at least one compound selected from the group consisting of an alkali metal carbonate, an alkali metal bicarbonate, and an alkali metal hydroxide; a crosslinked polymer in which a polymer having a carboxyl group has been crosslinked; and a non-crosslinked polymer obtained by polymerization of one or more monomers selected from the group consisting of vinyl acetate, acrylic acid, methacrylic acid, and a derivative thereof;
forming a coating film by applying the prepared coating liquid onto a supporting layer including a porous membrane; and
forming a separation-functional layer by removing the medium from the formed coating film.

* * * * *